United States Patent [19]

Wolf et al.

[11] 4,100,143

[45] Jul. 11, 1978

[54] FILAMENTS WHICH MAY BE CROSS-LINKED COMPRISING AT LEAST 65% ACRYLONITRILE AND 0.5–10% N-METHYLOL DERIVATIVE OF A URETHANE

[75] Inventors: Gerhard Dieter Wolf; Werner Schnoor, both of Dormagen; Jean-Claude Voegele, Dormagen-Hackenbroich; Ulrich Reinehr; Günther Nischk, both of Dormagen, all of Germany

[73] Assignee: Bayer Aktiengesellschaft, Leverkusen, Germany

[21] Appl. No.: 760,704

[22] Filed: Jan. 19, 1977

[30] Foreign Application Priority Data

Jan. 22, 1976 [DE] Fed. Rep. of Germany ....... 2602352

[51] Int. Cl.$^2$ .................. B01F 9/08; C08F 28/00; C08F 18/24; C08F 20/70
[52] U.S. Cl. .................. 526/301; 260/32.6 NR; 526/229; 526/307; 526/303; 526/312; 526/302; 526/287
[58] Field of Search .................. 526/312, 303, 307; 260/79.3 MU, 32.6 NR, 77.5 BB

[56] References Cited

U.S. PATENT DOCUMENTS

| 2,984,588 | 5/1961 | Grauligh et al. ............... 526/303 |
| 3,336,369 | 8/1967 | Schwiersch et al. ........... 526/312 |
| 3,379,670 | 4/1968 | Corradi et al. ............ 260/79.3 MU |
| 3,479,328 | 11/1969 | Nordstrom .................... 526/312 |
| 3,494,901 | 2/1970 | Dertel et al. .................. 526/312 |

FOREIGN PATENT DOCUMENTS

| 537,987 | 5/1953 | Canada .................. 260/77.5 BB |
| 39-5349 | 4/1964 | Japan .................... 526/303 |

*Primary Examiner*—Herbert J. Lilling
*Attorney, Agent, or Firm*—Plumley & Tyner

[57] ABSTRACT

The invention relates to cross-linkable or cross-linked filaments or fibers of a copolymer comprising at least 65% by weight of acrylonitrile and from 0.5 to 10% by weight of at least one copolymerised N-methylol compound of an unsaturated mono- or bis-urethane or an alkyl ether thereof and, optionally, at least one other copolymerisable monomer.

4 Claims, No Drawings

FILAMENTS WHICH MAY BE CROSS-LINKED COMPRISING AT LEAST 65% ACRYLONITRILE AND 0.5-10% N-METHYLOL DERIVATIVE OF A URETHANE

This invention relates to filaments of acrylonitrile copolymers which are cross-linked or may be cross-linked and which contain, as cross-linking component built into the molecule, at least one copolymerisable N-methylol compound of an unsaturated urethane or bisurethane or at least one copolymerisable alkyl ether of these N-methylol compounds of unsaturated urethanes or bisurethanes.

Polyacrylonitrile and copolymers of acrylonitrile with other comonomers are eminently suitable for the production of fibres and filaments which have excellent textile technological properties. However, it is well known that fibres which contain acrylonitrile are not so dimensionally stable under hot and wet conditions as fibres produced from other synthetic polymers. This poor dimensional stability under hot, wet conditions manifests itself in poor elasticity of stitches of knitted fabrics, poor stability of pressed pleats under washing conditions and creasing or sagging of the finished articles in hot washes.

It is known from the literature that fibres which have a cross-linked structure have improved dimensional stability. According to published Japanese Patent Application Sho 43-82 768, such cross-linked fibres may be obtained by polymerising a monomer mixture of at least 85%, by weight, of acrylonitrile and not more than 15%, by weight, of a N-methylol compound of an unsaturated amide in an aqueous concentrated salt solution containing zinc chloride as its main constituent, spinning the solution of the resulting polymer and carrying out the cross-linking of the polymer on the resulting fibres. To obtain cross-linking of the polymer during its preparation requires an addition of up to 0.3%, by weight, of zinc oxide.

According to German Offenlegungsschrift No. 2,438,211, fibres having good characteristics under hot, wet conditions may be obtained by mixing from 98 to 70% of a polymer which contains acrylonitrile with from 2 to 30% of a copolymer consisting of from 50 to 90% of acrylonitrile and from 10 to 50% of a comonomer which is capable of being cross-linked, spinning the mixture and finally heating the spun fibres to initiate a cross-linking reaction. The cross-linkage comonomers used are N-substituted derivatives of an ethylenically unsaturated acid amide, preferably N-methylolacrylamide, N-methylolmethacrylamide or N-methoxymethylacrylamide. When preparing the polymer containing comonomers which are capable of being cross-linked, however, the presence of from 2 to 10%, by weight, of a soluble salt, such as sodium sulphate, is necessary to prevent premature cross-linking. Moreover, for producing the fibres described in the above-mentioned document, the polymers components prepared and isolated in separate operations must first be mixed before the mixture may be spun.

It is therefore an object of the present invention to provide cross-linked or cross-linkable filaments or fibres of cross-linkable polymers which may be obtained without the conventional stabilizing additives for polymerisation and may be processed into filaments and fibres having improved dimensional stability, e.g. improved characteristics under hot, wet conditions, without having first to be mixed with other polymers. under hot, wet conditions, without having first to be mixed with other polymers.

It has not been found that acrylic fibres which have excellent characteristics under hot, wet conditions may be obtained if one uses as starting materials a copolymer of acrylonitrile and of a copolymerisable N-methylol compound of an unsaturated monourethane or bisurethane or of a copolymerisable alkyl ether of such N-methylol compounds of unsaturated monourethanes or bisurethanes and optionally other comonomers. It was surprisingly found that the polymers could easily be prepared without the presence of the known stabilizing additives.

It is therefore an object of this invention to provide acrylic fibres which have excellent characteristics under hot-wet conditions.

This and other objects which will be evident to those skilled in the art from the following description and the specific examples are accomplished by a filament or fibre of an addition copolymer comprising at least 65%, by weight, of acrylonitrile and from 0.5 to 10%, by weight, of at least one copolymerised N-methylol compound of an unsaturated monourethane or bis-urethane or of an alkyl ether thereof and, optionally at least one other copolymerisable monomer.

The present invention also relates to a process for the production of filaments or fibres from polymers having the composition indicated above.

In addition, the present invention relates to the use of the filaments or fibres according to the present invention for the production of dimensionally stable textile products.

The N-methylol compounds suitable for the purpose of the present invention include, in principle, all copolymerisable N-methylol compounds or alkyl ethers of the N-methylol compounds of unsaturated monourethanes or bis-urethanes. The N-methylol compounds which appear to be particularly suitable are the N-methylol compounds of unsaturated monourethanes or bis-urethanes and the corresponding alkyl ethers corresponding to the following general formula:

$$CR'R''=CR'''-CR^{IV}R^{V}-OCON-R \atop |\phantom{CR'R''=CR'''-CR^{IV}R^{V}-OCON}CH_2R^{VI}} \qquad (I),$$

wherein

R represents hydrogen, a straight- or branched-chain $C_1$–$C_6$ alkyl group, a cycloalkyl group or an optionally substituted phenyl group;

R' represents hydrogen or a methyl group;

R'' represents hydrogen, a methyl group or the group:

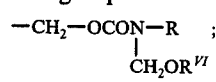

R''' represents hydrogen or the group: 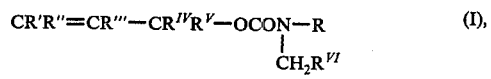

$R^{IV}$ represents hydrogen or a methyl group;

$R^{V}$ represents hydrogen or the group: $-CH_2-OCON-R$ ; and
$\phantom{R^{V} represents hydrogen or the group: -CH_2-OCON-}|\phantom{R}$
$\phantom{R^{V} represents hydrogen or the group: -CH_2-OCON-R}CH_2OR^{IV}$ $R^{VI}$ represents hydrogen, a straight- or branched-chain $C_1$–$C_6$ alkyl group or a cycloalkyl group.

The following are examples of suitable N-methylol compounds or N-methylol ethers of unsaturated mono- or bis-urethanes:

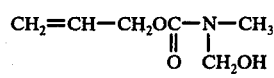 (II)

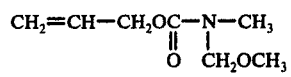 (III)

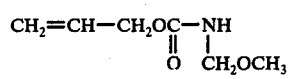 (IV)

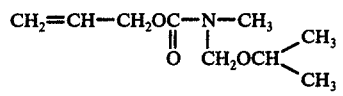 (V)

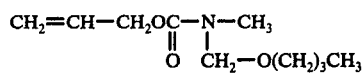 (VI)

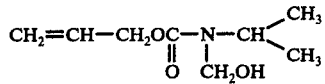 (VII)

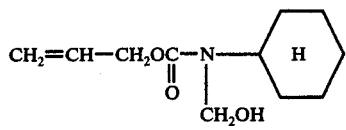 (VIII)

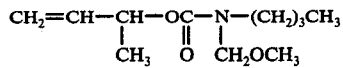 (IX)

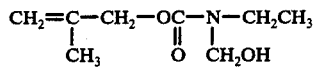 (X)

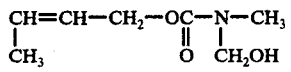 (XI)

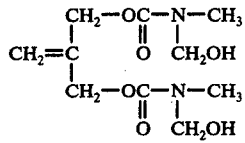 (XII)

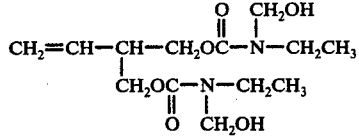 (XIII)

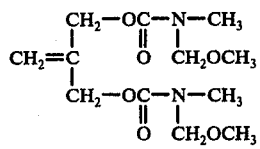 (XIV)

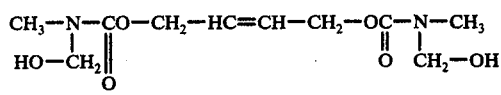 (XV)

It is particularly preferred to use the N-methylol compound of the allyl methyl urethane corresponding to formula (II) or alkylethers corresponding to formulae (III) and (IV).

The preparation of any of the suitable N-methylol compounds of unsaturated monourethanes or bis-urethanes and of the corresponding alkylethers is known in the art.

The other comonomers optionally used may be any of the monomers commonly used in the production of acrylonitrile fibres. The following are preferred: acrylic and methacrylic acid alkyl esters, e.g. (meth)acrylic acid ester and (meth)acrylic acid ethyl ester. These monomers are preferably incorporated by polymerisation in quantities of up to 10%, by weight. The conventional dye additives, may also be incorporated by polymerisation in quantities of up to about 3%, by weight, for example unsaturated sulphonic acids, preferably methallyl sulphonic acid, vinyl sulphonic acid, styrene sulphonic acid or their alkali metal salts. If monomers containing halogen are to be copolymerised for the purpose of improving the flame resistance, they are suitably used in quantities of from 10 to 30%, by weight.

Other comonomers which may be used include, preferably, those which may serve as cross-linking acceptors, i.e. compounds which are capable of reacting with the methylol urethane groups in the polymer chain in the presence of acids and/or under the action of heat. The following are examples of such copolymerisable cross-linking acceptors: unsaturated amides, such as acrylamide and methacrylamide, unsaturated urethanes, such as allyl methyl urethane, 2-methylolpropane diurethane-(1,3), unsaturated ureas, hydrazides, semicarbazides, etc., but unsaturated amides and urethanes are preferred.

The conventional polymerisation techniques may be employed for producing the copolymers according to the present invention, for example, solution polymerisation, dispersion polymerisation or suspension polymerisation. Polymerisation is preferably carried out in a precipitating agent or dispersing agent, preferably water. The process consists of polymerising together at least 65%, by weight, preferably at least 80%, by weight, of acrylonitrile, from 0.5 to 10%, by weight, preferably from 1 to 6%, by weight, of at least one copolymerisable N-methylol compound of an unsaturated urethane or bis-urethane or of a copolymerisable alkyl ether of these N-methylol compounds of unsaturated urethanes or bis-urethanes and preferably at least one other comonomer. The known redox systems are generally used as initiators, preferably potassium or sodium peroxydisulphate/potassium or sodium bisulphite, using a molar ratio of the two components of the initiator system of from 4:1 to 1:4 and an absolute quantity of initiator system of from 0.5 to 6%, by weight, based on the quantity of monomers. The process is generally carried out at a pH of from 3 to 4.5, preferably from 3.5 to 4, and at a temperature of from 30° to 70° C, preferably from 50° to 60° C. After a polymerisation time of, e.g. from 3 to 10 hours, preferably from 5 to 7 hours, the polymers may be isolated in the conventional manner by suction filtration, precipitation or evaporation of the solvent and then dried, e.g. at from 30° to 80° C for from 3 to 10 hours.

Whereas in the polymerisations previously known, in which N-methylol compounds or their derivatives, such as N-methoxymethyl compounds, were copolymerised, the presence of certain additives, such as zinc oxide or soluble salts, was necessary even during polymerisation in order to prevent cross-linking, the polymers according to the present invention may be prepared in the complete absence of such additives.

Cross-linking does not take place to any significant extent under these conditions.

This must be regarded as extremely surprising.

Although the molecular weights of the polymers according to the present invention could, in principle, be varied within wide limits by known methods, polymers having K-values according to Fikentscher of from 70 to 90 are particularly suitable for producing the filaments and fibres according to the present invention.

Polymers prepared as described above may be wet spun or, preferably, dry spun by conventional methods known in the art. The solvents used are preferably dimethylformamide, dimethylacetamide and dimethylsulphoxide. The spun goods obtained may subsequently be treated in known manner, i.e. stretched, washed, dried, crimped and cut.

The cross-linking reaction is preferably initiated in the course of subsequent treatment. Cross-linking after stretching has proved to be particularly advantageous because capillary breakage is thereby substantially avoided. The cross-linking reaction may be initiated in various ways, for example, cross-linked polyacrylonitrile fibres may be obtained by the prolonged action, e.g. from 1 to 30 minutes) of saturated steam or of dry heat, using drying times of from 2 to 15 minutes and drying temperatures of from 150° to 175° C. On the other hand, cross-linking may also be achieved within shorter times and at lower temperatures if the material has previously been brought into contact with dilute acids, for example after the washing operation. In that case, drying times of up to 5 minutes and drying temperatures of from 120° to 175° C are fully sufficient for the obtaining of fibres which are completely insoluble in hot and cold solvents for acrylonitrile polymers, for example dimethyl formamide. Acids which have proved suitable for the purpose of the present invention include: dilute sulphuric aicd, phosphorous and phosphoric acid, oxalic acid, formic acid and acetic acid.

Another advantage of the filaments or fibres according to the present invention, apart from their dimensional stability, is their high density and their resistance to the formation of vacuoles, and these properties remain unchanged even after finishing processes, such as steaming, boiling or dyeing. The changes in colour tone which are often to be a disadvantage in such pretreated acrylic fibres are thereby completely avoided.

One method of detecting vacuoles, apart from measurements of density, scattered light and gloss, consists of embedding acrylic fibres in a medium having the same refractive index ($n_D^{20}$ = 1.52). Acrylic fibres which are free from vacuoles appear invisible under these conditions, while fibres which contain vacuoles have a milky cloudiness (see P. A. Koch, Rezeptbuch für Faserstofflaboratorien, Springer-Verlag, Berlin 1960, pages 59–61). To test acrylic fibres for their resistance to the formation of vacuoles, they were treated in boiling water for 10 minutes, dried in a vacuum at 40° C for 12 hours and immersed in anisole ($n_D^{20}$ = 1.517) in a glass cuvette which was illuminated from one side by a microscope lamp. Material which is free from vacuoles is optically invisible under these conditions whereas fibres which contain vacuoles appear white. The amount of vacuoles present may be assessed semi-quantitatively from the intensity of the effect obtained, always using the same quantity of fibres.

The density of the fibres was determined by the method of H. de Vries and H. G. Weyland, Textile Research Journal 28 No. 2, pages 183 to 184 (1958).

Another advantage of the fibres according to the present invention is their excellent stability to deformation under heat. Whereas the conventional commercial dry spun or wet spun acrylic fibres generally begin to show signs of "flowing" at temperatures of from 205° to 225° C when viewed using the melting point determination microscope and lose their shape, the fibres according to the present invention do not begin to show any structural alterations at temperatures below 350° C and retain their original form.

To test the dimensional stability, the ultimate tensile strength (cN/dtex) and elongation on tearing (%) at 20° C were measured and compared with the values obtained with commercial dry spun acrylic fibres. As may be seen from the results, the flow properties of the fibres according to the present invention are much lower than those of the corresponding commercial acrylic fibres. The results are not affected by the particular method used for cross-linking the fibres.

In the following Examples, which are to further illustrate the invention without limiting it, parts, by weight, are related to parts, by volume, as grams to milliliters.

EXAMPLE 1

390 l of water were boiled for 30 minutes under an atmosphere of nitrogen in a 450 l enamel boiler and then cooled to 50° C. 28 kg of acrylonitrile followed by 1.2 kg of N-methyl-N-methylol allylurethane are added at this temperature and the pH is adjusted to 4 using 20% sulphuric acid. Polymerisation is initiated by the addition of 0.33 kg of potassium peroxydisulphate and 1.32 kg of sodium disulphite. The suspension is cooled to room temperature after 6 hours and suction filtered through a 250 l filter. The residue is washed neutral with water and dried in a vacuum at from 50° to 60° C. Yield 27.8 kg (92.6% of the theoretical yield). K-value: 86.5.

A solution of 25 parts, by weight, in 75 parts, by weight, of dimethylformamide is tempered at 80° C for 6 hours in a thermostat. The "falling ball time", that is to say the time in seconds taken by a one-eighth inch ball to fall by 7 cm in the solution heated to 80° C, is measured every hour. The times are approximately constant during 6 hours.

If 5% of an organic or inorganic acid, based on the solid content, are added to a second sample of the same solution and the solution is then tempered at 80° C for 6 hours, the falling ball times are found to increase considerably after one hour:

| Tempering time in hours | 1 | 2 | 3 | 4 | 5 | 6 |
|---|---|---|---|---|---|---|
| Falling ball time in sec. | 55 | 69 | 81 | 86 | 91.5 | 97 |

A foil is cast from a 25% solution of the polymer obtained as described above. The foil is briefly dried and precipitated in 1% aqueous hydrochloric acid solution. The cast foil is washed in water until neutral and dried in a vacuum at from 90° to 100° C. At the end of these treatments, only small portions of the foil dissolve in DMF and the foil is cross-linked.

The acrylonitrile copolymer described above is dissolved in dimethylformamide for preparation of a 22%, by weight, spinning solution. After filtration, the solution is dry spun by the conventional process. The filaments are collected on spools at the outlet of the spinning shaft. Every four spools of filament yarn having a total titre of 2880 dtex are then combined into one band which is stretched by 1:3.6 in boiling water, washed and treated with antistatic dressing. It is then dried tension-free at 170° C for 10 minutes, at which stage cross-linking of the fibre is initiated. The titre of the individual filament is 3.3 dtex.

Resistance to the formation of vacuoles

The density of the fibres is 1.185 g/cc before and after a 10 minute treatment in boiling water. Both the samples which have been treated in boiling water and dried in a vacuum at 40° C for 12 hours and the untreated samples were embedded in anisole. The samples showed no differences in the transparency of the solutions.

Tack point

Under the melting point microscope, the fibres show no signs of deformation at temperatures below 350° C.

Solubility

The fibres are still completely undissolved after one hour in cold dimethylformamide and in dimethylformamide heated to 130° C.

Dyeing

The whole cross-section of the cross-linked fibres is completely dyed.

Dimensional stability (a) The hydrothermal elongation produced under a tension of 0.30 p/dtex in boiling water was measured on cross-linked fibres and on un-crosslinked comparison fibres. It amounts to 18.2% in the cross-linked fibres and the fibres do not tear whereas the uncross-linked acrylic fibres tear after an elongation of more than 200%.

(b) Ultimate tensile strength and elongation at tearing at 20° C demonstrate the reduced "flow properties" of the fibres according to the present invention.

|  | Cross-linked fibres according to Example 1 | Comparison |
|---|---|---|
| Ultimate tensile strength | 2.65 cN/dtex | 2.52 cN/dtex |
| Elongation on tearing | 20% | 54% |

EXAMPLE 2

Part of the band described Example I having a total titre of 2880 dtex was washed after it had been stretched by 1:36 and was subsequently passed through an aqueous bath which had been adjusted to pH 1 using oxalic acid. The temperature of the bath was from 80° to 95° C and the residence time of the band in the bath from 50 to 60 seconds. The band was then revived and dried in a calender drier for one hour at 160° C under conditions which allowed no shrinkage. The titre of the individual filaments was 3.3 dtex. The resistance to the formation of vacuoles, tack point, solubility, dyeing and dimensional stability of the cross-linked fibres were exactly the same as described in Example 1.

EXAMPLE 3

A solution of 540.4 parts, by weight, of acrylonitrile, 14 parts, by weight, of N-methyl-N-methylolallylurethane and 5.6 parts, by weight, of sodium methallyl sulphonate in 7440 parts, by volume, of water was adjusted to pH 4 using 20% sulphuric acid at 50° C. Polymerisation is started under an atmosphere of nitrogen by the addition of 6 parts, by weight, of potassium peroxydisulphate and 24 parts, by weight, of sodium disulphite. After 6 hours, the polymer is suction filtered, washed neutral and dried. Yield: 498.5 parts, by weight (89% of the theoretical yield) K-value: 84.

A 25% solution of this polymer in dimethylformamide was heated to 80° C in a thermostat and tempered at this temperature for 6 hours. The falling ball time was measured after each hour. The solution showed no signs of increase in viscosity during the first 6 hours. The falling ball times were from 66 to 71 seconds.

The same spinning solution was spun into a precipitation bath through a 50 aperture nozzle (diameter of individual apertures 100 $\mu$). The coagulated filaments were passed through a 1% hydrochloric acid solution heated to 50° C, washed in water, briefly dried at 100° C and wound. The treated filaments were then no longer soluble in dimethylformamide.

EXAMPLE 4

518 parts, by weight, of acrylonitrile, 28 parts, by weight, of methyl acrylate and 14 parts, by weight, of N-methyl-N-methylol-allylurethane were dissolved in 7440 parts, by volume, of water. The solution was then heated to 50° C, the pH was adjusted to 4 using dilute sulphuric acid and polymerisation was started by the addition of 6.5 parts, by weight, of potassium peroxydisulphate and 26 parts, by weight, of sodium disulphite. After 6 hours, the product was suction filtered, washed neutral and dried in a vacuum at from 50° to 60° C. Yield: 507 parts, by weight (90.5% of the theoretical yield) K-value 85.

When a 25% solution of this copolymer was tempered at 80° C in DMF, the falling ball times were practically constant at from 65 to 70 seconds over a period of 6 hours.

A 26% solution of the polymer was spun wet and the filaments were after-treated in 0.1N sulphuric acid, washed and dried at 100° C. The resulting fibre material was then no longer soluble in dimethylformamide.

EXAMPLE 5

526.4 parts, by weight, of acrylonitrile, 28 parts, by weight, of the bis-methylol compound of butene-(1)-bis-urethane-(3,4) corresponding to the formula:

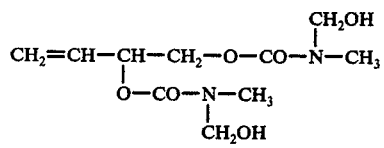

and 5.6 parts, by weight, of sodium methallyl sulphonate were dissolved in 7440 parts, by volume, of water at 50° C. The solution was adjusted to pH 4 using 20% sulphuric acid and polymerisation was started by the addition of 4 parts, by weight, of potassium peroxydisulphate and 16 parts, by weight, of sodium disulphite. The product was suction filtered after 6 hours, washed neutral and dried. Yield: 480 parts, by weight (86% of the theoretical yield) K-value: 87.5.

A spinning solution of 25%, by weight, of the polymer in dimethylformamide was spun into a precipitation bath consisting of a mixture of water and dimethylformamide, and the fibre bundle was passed through another bath of 0.1N sulphuric acid, washed and briefly dried at 100° C. The treated fibres were then only slightly soluble in dimethylformamide.

EXAMPLE 6

518 parts, by weight, of acrylonitrile, 28 parts, by weight, of acrylic acid amide and 14 parts, by weight, of N-methyl-N-methylolallyl urethane were dissolved in 7440 parts, by volume, of water at 50° C and pH 4. Polymerisation was started by the addition of 4 parts, by weight, of potassium peroxydisulphate and 16 parts, by weight, of sodium disulphite. The polymer was suction filtered after 6 hours, washed neutral and dried. Yield: 515 parts by weight (92% of the theoretical yield) K-value 77.5.

The falling ball times of a 27% solution of the polymer in dimethylformamide at 80° C remained constant over a period of 6 hours.

27.5 parts, by weight, of the acrylonitrile copolymer were dissolved in dimethylformamide and the solution was spun into a precipitation bath of water and dimethyl formamide. After treatment in 1% hydrochloric acid, the filaments were washed and dried at 100° C. They were insoluble both in cold and in hot dimethylformamide.

EXAMPLE 7

28.8 kg of acrylonitrile and 1.2 kg of N-methoxymethyl-allylurethane were dissolved in 390 liters of water at 50° C. Under an atmosphere of nitrogen, the pH was adjusted to 4 using 20% sulphuric acid and polymerisation was started by the addition of 0.3 kg of potassium peroxydisulphate and 1.2 kg of sodium disulphite. The polymer was suction filtered through a 250 l filter after 6 hours, washed neutral with water and dried in a vacuum at from 50° to 60° C. Yield: 26.7 kg (89% of the theoretical yield) K-value: 80.

A 26.5% solution of this acrylonitrile copolymer in dimethylformamide was spun into a precipitation bath of water and dimethylformamide through a 50 aperture spinning die. After treatment in 1% sulphuric acid, the filaments were washed and briefly dried at 100° C. They were insoluble both in cold and in hot dimethylformamide.

EXAMPLE 8

512.4 parts, by weight, of acrylonitrile, 28 parts, by weight, of acrylic acid amide, 14 parts, by weight, of N-methoxymethylallyl urethane and 5.6 parts, by weight, of sodium methallylsulphonate were copolymerised in 7440 parts, by volume, of water at pH 4 and 50° C by the addition of 5 parts, by weight, of potassium peroxydisulphate and 20 parts, by weight, of sodium disulphite. The polymer was isolated by suction filtration after 6 hours. It was washed neutral and then dried at from 50° to 60° C. Yield: 521 parts, by weight (39% of the theoretical yield) K-value 84.

The falling ball times of a 26% solution of a copolymer in dimethylformamide were from 56 to 60 seconds.

The acrylonitrile copolymer was dissolved to form a 26% by weight, solution in dimethylformamide and wet spun by the conventional process. After the precipitation baths, the filament was passed through an aqueous 0.1N sulphuric acid bath, washed, dried at 100° C and wound.

The cross-linked filaments were no longer soluble in dimethylformamide.

EXAMPLE 9

A solution of 64.05 parts, by weight, of acrylonitrile, 5.25 parts, by weight, of N-methyl-N-methoxymethylallyl urethane and 0.7 parts, by weight, of sodium methallyl sulphonate in 930 parts, by volume, of water was adjusted to pH 4 at 50° C under an atmosphere of nitrogen. Polymerisation sets in after the addition of 0.5 parts, by weight, of potassium peroxydisulphate and 2 parts, by weight, of sodium disulphite. After 6 hours, the polymer is suction filtered, washed neutral and dried. Yield: 59 parts, by weight (84.3% of the theoretical yield) K-value: 79.

EXAMPLE 10

512.4 parts, by weight, of acrylonitrile, 28 parts, by weight, of acrylic acid amide, 14 parts, by weight, of N-methyl-N-methoxymethylallyl urethane and 5.6 parts, by weight, of sodium methallyl sulphonate were dissolved in 7440 parts, by volume, of water at 50° C and pH 4. Polymerisation was started by the addition of 6 parts, by weight, of potassium peroxydisulphate and 24 parts, by weight of sodium disulphite. After 6 hours, the polymer was isolated by suction filtration, washed neutral and dried. Yield: 482 parts, by weight (86% of the theoretical yield) K-value: 81.

A 28%, by weight, solution of the acrylonitrile copolymer in dimethylformamide was spun into a precipitation bath of water and dimethylformamide and the coagulated filament was passed through a bath containing 0.1N formic acid heated to 60° C, and then washed and dried. The filament treated in this way was already cross-linked and no longer soluble in dimethylformamide.

What is claimed is:

1. A filament or fiber of an addition copolymer comprising at least 65% by weight of acrylonitrile; 0.5–10% by weight of at least one N-methylol compound of an unsaturated monourethane, bisurethane, alkyl ether of a monourethane, or ethyl ether of a bisurethane; and 0–30% by weight of at least one comonomer selected from the group consisting of acrylic acid alkyl esters, methacrylic acid alkyl esters, unsaturated sulfonic acids, unsaturated amides, unsaturated urethanes, unsaturated ureas, unsaturated hydrazides, unsaturated semicarbazides, and halogen containing monomers copolymerizable with acrylonitrile, the amount of said halogen containing monomer being 10–30% and the amount of all others of said comonomers being 0–10%.

2. The filament or fibre of claim 1 which comprises at least 80% by weight of acrylonitrile.

3. The filament of fibre of claim 1 which comprises from 1 to 6%, by weight, of at least one copolymerised N-methylol compound of an unsaturated mono- or bisurethane or of an alkyl ether thereof.

4. A process for the production of a filament or fiber of claim 1 which comprises spinning a cross-linkable acrylonitrile copolymer of claim 1.

* * * * *